US007525735B2

(12) United States Patent
Sottilare et al.

(10) Patent No.: US 7,525,735 B2
(45) Date of Patent: Apr. 28, 2009

(54) HIGH RESOLUTION HEAD MOUNTED PROJECTION DISPLAY

(75) Inventors: Robert Anthony Sottilare, Chuluota, FL (US); Ricardo F. Martins, Apopka, FL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 50 days.

(21) Appl. No.: 11/803,785

(22) Filed: May 16, 2007

(65) Prior Publication Data
US 2008/0285141 A1 Nov. 20, 2008

(51) Int. Cl.
*G02B 27/14* (2006.01)
(52) U.S. Cl. ...................................... 359/633; 359/630
(58) Field of Classification Search .......... 359/629–640
See application file for complete search history.

(56) References Cited

U.S. PATENT DOCUMENTS

| 3,902,792 | A | * | 9/1975 | Plummer | 359/718 |
| 4,200,366 | A | * | 4/1980 | Freeman | 353/78 |
| 6,147,805 | A | * | 11/2000 | Fergason | 359/630 |
| 6,181,475 | B1 | | 1/2001 | Togino | |
| 6,353,503 | B1 | | 3/2002 | Spitzer | |
| 6,963,454 | B1 | | 11/2005 | Martins | |
| 6,999,239 | B1 | * | 2/2006 | Martins et al. | 359/630 |

OTHER PUBLICATIONS

Laurie Marshall, Robert Sottilare, Ricardo Martins, Justin Morgan; Modeling the Visual Components of a Wearable Head Mounted Display for Future Ground Soldier Systems.

* cited by examiner

*Primary Examiner*—Ricky L Mack
*Assistant Examiner*—Vipin M Patel
(74) *Attorney, Agent, or Firm*—Eliot Abolafia

(57) ABSTRACT

An exemplary embodiment of the invention relates to an on-axis or near on-axis optical head mounted projection display optical assembly for transmitting and magnifying a real image to an eye. The assembly comprises a miniature display, a projection lens for receiving the light rays from the display, a second lens positioned to receive the light from the projection lens, a beam splitter positioned for receiving and splitting the light rays from the second lens, a retro-reflective screen positioned for receiving the reflected portion of the split light rays from the beam splitter, and then reflecting the portion of split light rays wherein the portion of split light rays passes through the beam splitter. A third lens is positioned to receive the portion of split light rays from the retro-reflective screen and through the beam splitter.

17 Claims, 5 Drawing Sheets

HIGH RESOLUTION HEAD MOUNTED PROJECTION DISPLAY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE OR A COMPUTER PROGRAM LISTING APPENDIX SUBMITTED ON A COMPACT DISC

Not Applicable

BACKGROUND OF THE INVENTION

1. Field of the Invention

This invention relates generally to projection displays and more particularly to head-mounted projection displays.

2. Description of the Related Art

Head Mounted Projection Displays (hereafter, HMPDs) have traditionally been, and are currently utilized in a variety of applications including maintenance, training, entertainment, and operations, including military operations. The term HMPD refers to a visual display that is mounted on a head or alternatively on, or inside a helmet with an image provided by an image source such as a liquid crystal display, a cathode ray tube or some other source being generally well known. The HMPD is positioned such that the displayed image is viewed as a real image by an eye. Furthermore HMPDs can be monocular or binocular.

In military applications, such as land combat ground soldier applications, requirements for target detection and recognition are very important. HMPDs seek to provide the user with enriched information, that is, information beyond that of what a human can gather with only biological vision.

Referring to FIG. 1, a typical land combat system for a ground soldier that exemplifies the need for a high resolution system with high field of view that includes an HMPD is illustrated at 10. The typical system includes a weapon subsystem 12, an integrated helmet assembly subsystem (IHAS) 14, computer master hub 16, radio 18, and associated interconnecting cable and hardware 20.

The weapon subsystem 12 typically includes an instrumented rifle having one or more sensors, for example, a weapon sight such as a thermal sight, video camera, and a laser rangefinder. As used in this specification the term sensor includes any input device for presentation on the HMPD. The exemplary monocular HMPD processes the data from the sensors and displays images of the data for presentation to the eye.

The IHAS 14 includes a helmet, preferably a light weight helmet and includes the HMPD for receiving and outputting processed sensor data. It is very important that HMPDs accurately receive and relay sensor data for object detection and recognition. For example, the Department of the Army specifies a capability objective for detection and recognition in its land warrior System.

The capability objective is defined in terms of performance, and the designer must account for the limitations of the human visual system, and the particular HMPD design for optimal detection and recognition. For example, HMPD design should recognize that peripheral vision is used to detect targets for pure detection, while central vision is focused on the recognition of the target. Therefore, the design of the HMPD represents complex tradeoffs that also include the size and weight of the HMPD components.

A typical HMPD and viewing system using a remote retro-reflector and method of displaying an image is described in U.S. Pat. No. 6,147,805 which is herein incorporated in its entirety by reference. The optics of the display include an image generator with light from the image generator transmitted through a lens and further transmitted to a beam splitter wherein the light is reflected from a retro-reflector to an eye. The retro-reflective screen is located external to the head mounted display.

Another head-mounted display is disclosed in U.S. Pat. No. 6,999,239 which is herein incorporated in its entirety by reference. The invention incorporates projective optics and a retro-reflective screen to eliminate the requisite use of an external retro-reflective screen to provide a see-through head mounted projection display. However, the optics is not optimized for detection and recognition capabilities, particularly since the see-through design decreases sensitivity for detection and recognition.

Referring to FIG. 2, an exemplary disclosure of an off-axis prism is illustrated as disclosed in U.S. Pat. No. 6,181,475. The prism can be considered as an off-axis eyepiece design for a nominal field-of-view (FOV) up to 40-degrees. The main disadvantage of the prism is the ability to achieve acceptable optical performance over a large FOV. The off-axis optical surfaces produce large amounts of aberrations such as astigmatism and distortion. In addition, chromatic aberration is induced to a single glass material. The performance of the prism can be improved by adding an aspheric surface in place of spherical surfaces to reduce the large off-axis aberration to achieve a reasonable optical performance, but the design still has limitations in correcting optical aberrations having only three working surfaces. While the off-axis prism provides a compact lens, detection and recognition capabilities are degraded by the aberration.

As can be appreciated, the application of the optimal HMPD display is complex. The design of the HMPD has a direct impact on human performance. Existing HMPDs are limited in their ability to support detection and recognition requirements, an especially important requirement in military ground operations or in aircraft, ship and harbor operations. These design limitations include, but are not limited to inadequate display resolution and field of view, limited graphics capabilities, and significant depth perception and peripheral vision problems. It is to be appreciated that once a particular HMPD is selected for use then the sensor that is to be associated with the application is selected so as to fully utilize the HMPD capabilities.

BRIEF SUMMARY OF THE INVENTION

It is an object of the invention to account for the limitations of the human visual system and the optimal head mounted display to optimize detection and recognition.

It is a further object of the invention to incorporate projective optics to eliminate the requisite use of an external retro-reflective screen.

It is a still further object of the invention to produce an immersive HMPD display for non-see-through capabilities.

It is another object of the invention to be light weight with low moment of inertia with respect to the user's neck.

It is yet another object of the invention to clearly display a target large enough to identify, along with a wide enough field of view to visually stabilize the target.

In one aspect of the invention a head mounted projection display (HMPD) optical lens assembly for transmitting and magnifying a real image to an eye is disclosed. The assembly comprises a miniature display, a projection lens, for example landscape lens system, for receiving the light rays from the display, a second lens having a Fno between 0.1 and 3.0 positioned to receive the light rays from the projection lens for adjusting eye relief, a beam splitter positioned for receiving and splitting the light rays from the second lens, a retro-reflective screen positioned for receiving the reflected portion of the split light rays from the beam splitter and then reflecting the portion of split light rays along an least partially conjugate optical path relative to the incident light wherein the portion of split light rays passes through the beam splitter, and a third lens having a Fno between 0.1 and 3.0 positioned to receive the portion of split light rays from the retro-reflective screen that passes along the at least partially conjugate path and through the beam splitter, the third lens passing the light for viewing of the real image at the optical exit pupil by the eye.

In a yet additional aspect of the invention, a second retro-reflective screen can be mounted below the beam splitter so that the split rays from the beamsplitter will recombine to create image with enhanced brightness.

In another aspect of the invention, a binocular is disclosed having the head mounted projection display of the present invention incorporated therein.

These and other features and advantages of the present invention may be better understood by considering the following detailed description of certain preferred embodiments. In the course of this description, reference will frequently be made to the attached drawings.

BRIEF DESCRIPTION OF THE SEVERAL VIEWS OF THE DRAWING

Referring now to the drawing wherein like elements are numbered alike in the several FIGURES.

DETAILED DESCRIPTION OF THE INVENTION

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

Figure 3:
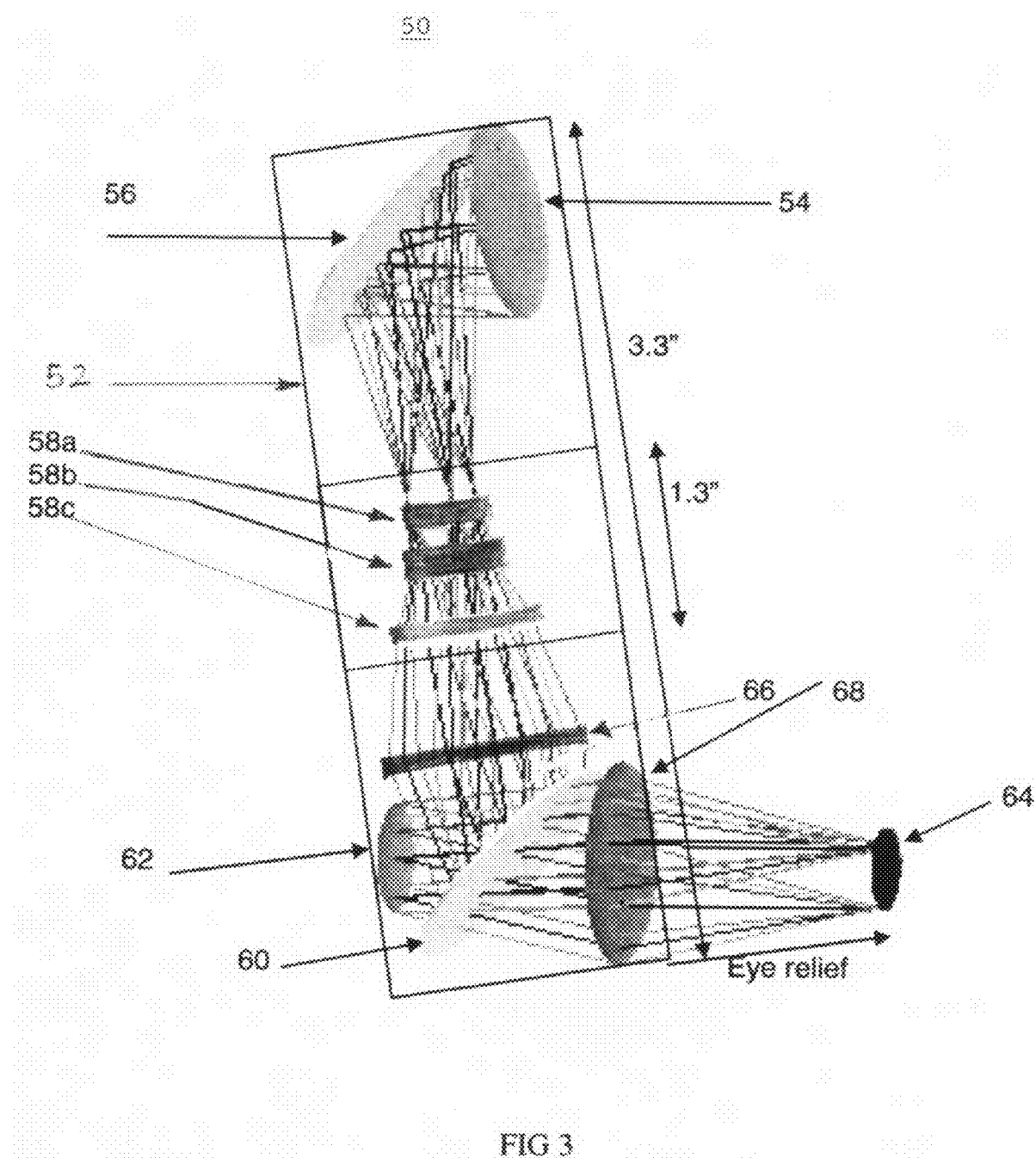
FIG. 3 is planar view of an exemplary embodiment of the present invention.

Referring to FIG. 3, an exemplary embodiment is illustrated generally at 50. A housing 52 contains an optics system which includes a miniature display 54, a mirror 56, a projection lens, preferably a landscape lens 58a,b,c, a beam splitter 60, and a retro-reflective screen (also referred to as a retro-reflector) 62 for outputting the rays to an eye 64. A second lens 66 with a Focal Number (Fno.) equal to about 1 and generally between 0.1 and 3.0 is located between the landscape lens and the beam splitter. A third lens 68 with an Fno. equal to about 1 and generally between 0.1 and 3.0 is located between the beam splitter 60 and the eye 64. The distance from the vertex of the last physical surface, here the second lens 68, of the system to the exit pupil of the eye 64 is defined as the eye relief.

The image (created by a mirror or alternatively by an image source such as a miniature display that replaces the mirror), projection lens and beam splitter comprise an on-axis or nearly on-axis optical system with overall length preferably 3.3 inches or less, although it is within the contemplation of the illustrated embodiment that the overall length may be greater or less than 3.3 inches. Here, the novelty of the illustrated embodiment is the design of an on-axis or nearly on-axis optics system that can be light weight and capable of being compacted to less than 3.3 inches. An on-axis optical system means an optical design in which light is incident on optical surfaces having rotational symmetry about the optical system while a nearly on-axis optical system means a system that is close enough to axial so as to not require correction of aberrations induced by the off-axis geometry.

In the exemplary embodiment, the housing 52 has sides of preferably 1.6 inches or less, although it is within the contemplation of the illustrated embodiment that the diameter may exceed 1.6 inches. Alternatively the housing can be cylindrical with a diameter of about 1.6 inches. A penetration in the housing is provided for the light exiting the housing for transmission to the eye 64. As is well known in the art, the components of the optics systems are often supported by the housing. Penetrations (not shown) are provided for power and signal wires to feed the miniature display. Typically, the housing is constructed of light weight materials such as aluminum, plastic, composite materials or other light weight materials.

Figure 1:
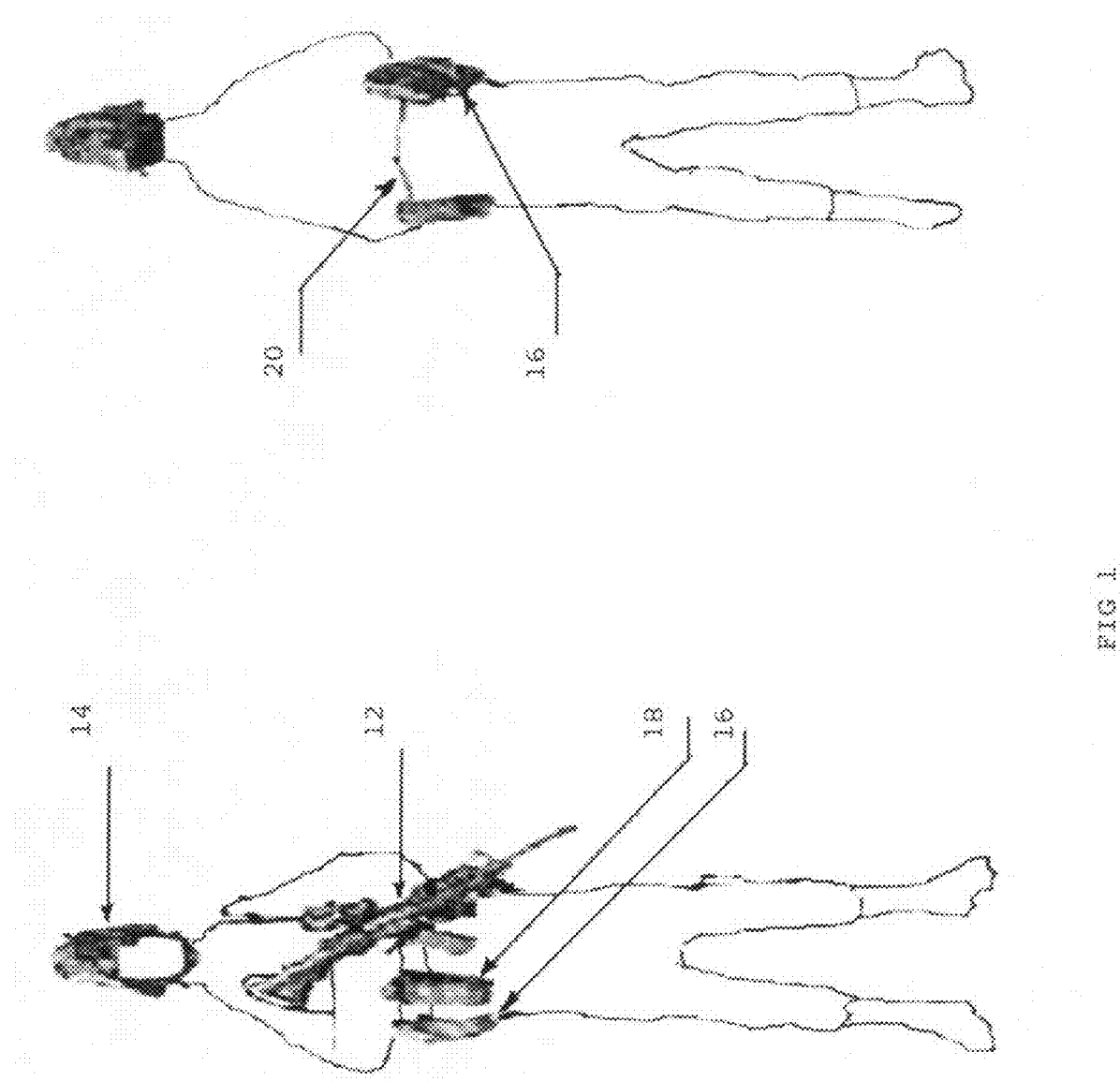
FIG. 1 is a three dimensional rendering of a system embodying an HMPD that corresponds to the Helmet System with Optical Display.

The microdisplay 54 is positioned beyond or at the focal point of the projection lens 58 and is used to display an image derived from the sensor input (see FIG. 1). In the land warrior system the sensor input includes input from charge-coupled device (CCD) representing target imagery. Although with current technology high resolution miniature displays such as, LCDs, LCOS, OLEDs or DLPs can replace the CCD. The resolution of the microdisplay preferably should be equal to the resolution capability of the CCD for full utilization of the microdisplay. The microdisplay is positioned in the upper portion of the housing and further positioned to project the rays of its images onto the mirror for relaying the rays to the projection lens. Alternatively, the microdisplay can be position in the housing and centered, or nearly centered on the optic axis with the rays projected directly through the landscape lens. The alternative positioning shifts the center of gravity towards or onto the optic axis of the assembly. It is to be appreciated that the microdisplay can be any one of a self-emissive, reflective, or transmissive type such as active matrix liquid crystal, organic light emitting diode, liquid crystal on silicon, DLP, LCOS or other well-known types. Other available displays include laser, laser-diode and even cathode ray tube. As is well known, a key component to designing lightweight, compact, and high-quality optics lies in the microdisplay, especially its physical size and whether it is self-emitting or requires additional illumination optics.

Ambient illumination levels determine the display requirements as image source spectrum is combined with the spectral response of the eye at the illumination level of interest. Preferably, the illumination of the microdisplay 54 should take into consideration the losses of the beam splitter 60 and the retro-reflective screen 62 used in the HMPD. If an illumination optic is required, schemes for compact illumination are within the scope of the present invention although compactness can be compromised for the larger size microdisplays exceeding 1" diagonal. Furthermore, as is well-known in the art, display resolution and color capability will require more stringent optics requirements requiring optical aberration correction across the visible spectrum. This correction is accomplished by design of the projection lens 58.

The mirror 56 is angularly disposed from the miniature display 54 such that the light from the miniature display is reflected along the direction of the optic axis of the projection lens 58 thereby minimizing the overall length of the HMPD. The mirror is generally flat with no curvature, and high reflective properties for the light frequencies from the microdisplay to minimize illumination losses.

The projection lens 58 functions as projection optics to form a real image which is a magnified image provided by the miniature display 54, which is located beyond the focal point of the lens. Although the illustrated embodiment discloses a landscape lens, alternative embodiments include a fisheye lens, Fresnel lens, and other projection lens. As illustrated, the landscape lens consists of three singlets 58a, b, and c. Use of the singlets in the landscape lens design minimizes the aberrations and to acts as a magnifier of the real image produced by the miniature display. Aberrations, in terms of image quality are deviations from the points in the object map to points in the image, as limited by diffraction; deviations between the map of object planes and image planes; and, deviation in magnification across the image. Although three singlets are illustrated, the lens may include fewer or additional singlets, doublet and triplets along with coatings, polarization filters and other components as are well known in the art for optimizing the transmission and magnification of the image. Each lens of the landscape lens may be made of any well known transmissive material such as but not limited to glass or plastic, with plastic components generally providing a lower weight than glass. For a HMPD, functional lightweight materials are preferable to heavier materials.

The beam splitter 60 is placed after the projection lens 58 with respect to the light rays exiting the landscape lens and preferably at 45 degrees with respect to the optical axis of the landscape lens. The beam splitter bends the rays at 90 degrees away from the eye 64 and towards the retro-reflective screen 62. The beam splitter also passes light rays in the conjugate optics path from the retro-reflective screen to the output port for viewing by the eye. The beam splitter and the retro-reflective screen cooperate as a conjugate optics system to provide the conjugate optics path. As is well known in the art, because of the optical characteristics of retro-reflective screens, the light rays, to a first order approximation, are reflected back onto themselves in the opposite direction upon hitting the material surface, which allows the light to reach the user's eyes. Typically, the beam splitter is constructed similar to a partially silverized mirror.

The second lens 66 is positioned between the beam splitter 60 and the landscape lens 58. The lens 66 is a singlet lens preferably with Fno. equal to about 1. Varying the distance of the lens from the projection lens, varies the eye relief. Typically the eye relief will be between 15 mm to 40 mm and preferably the eye relief will be 35 mm.

The retro-reflective screen 62 is placed within the lower section of the housing opposite the eye 64. The retro-reflective screen directs light back out, in principle, exactly in the same direction when the light strikes the retro-reflective screen. The reflected light is redirected from the retro-reflective screen with the angle of incidence equal to the angle of refraction. The retro-reflective screen eliminates optical cross-talk between users and allows for multiple users to interact with a virtual environment. As is well known in the art typical materials include aluminum, chromium or silver with thickness on the order of several hundred angstroms. An advantage of the retro-reflective screen is that it maximizes light throughput compared with a diffused screen.

The third lens 68 placed between the beam splitter 60 and the eye 64 has an Fno. approximately equal to 1 and images the retro-reflective screen 62 at a conjugate location. After being redirected from the retro-reflective screen, the light transfers through the third lens 68 with an Fno. approximately 1 to form an exit pupil at the desired eye relief location. In the exemplary embodiment, the retro-reflective screen is preferably placed along the eye path to remove the distinguishable bright pupil on the eye that can be seen externally in a see-through system.

For tasks such as targeting and object recognition, a field of view (FOV) of up to 50 degrees is useful although the FOV of the illustrated embodiments is typically 30 degrees.

Figure 4:
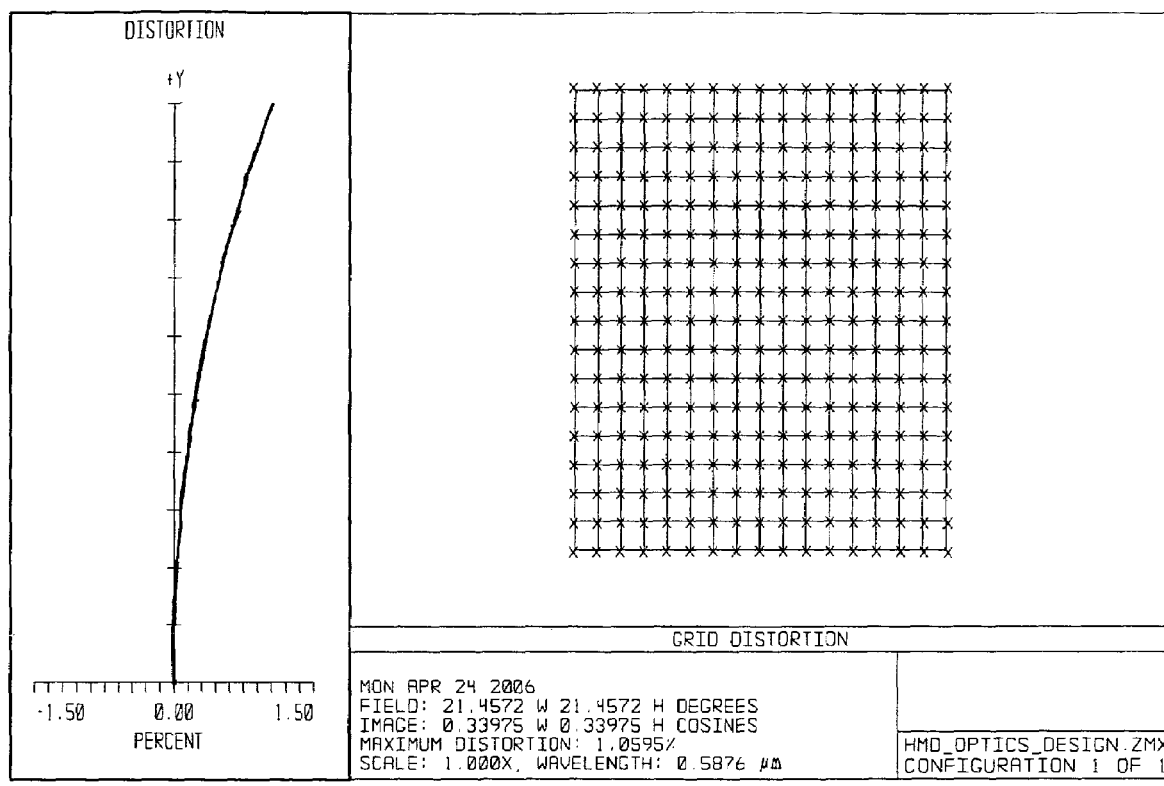
FIG. 4 is a diagram illustrating the performance of the exemplary embodiment.

Referring to FIG. 4, the inherent distortion produced in the illustrated embodiment is well below the human visual detection capability. The illustrated embodiment produces an overall distortion of 1.05% at the maximum point in the field whereas, 2.5% or greater is our minimum human detectable percentage. Another benefit is that the illustrated embodiment has greater potential of scalability such that the eye relief can easily be increased by simply increasing the distance between the first Fno. ~1 lens and projection lens system. In addition, the exit pupil and field of view (FOV) can be increased by re-optimizing the design while keeping all of the aberrations to a minimum.

It is to be appreciated that the selection of dimensions, 3.3"×1.6"×1.6" is novel in the art and chosen by the inventors in a tradeoff between the objectives of lightness and the higher bending of light rays and aberration resulting from yet smaller dimensions.

Alternate Embodiments

It is to be appreciated that while describing a monocular design, the illustrated embodiment is suitable for binocular applications.

It is to be further appreciated that the housing portion containing the retro-reflective screen can be modified to include an opening and the retro-reflective screen can be modified to pass the ambient light received from the opening to provide a combined image for augmented reality.

Figure 5:
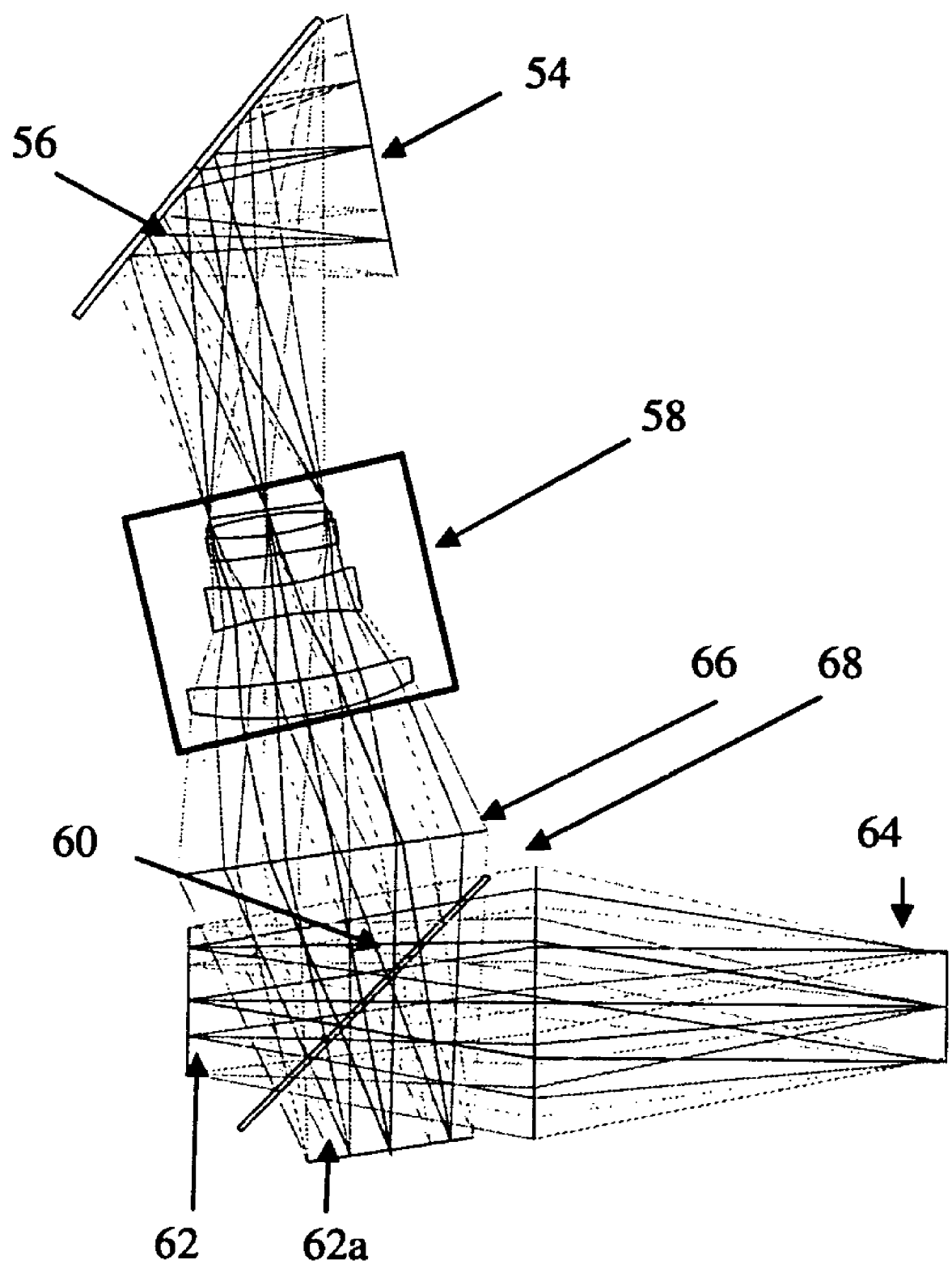
FIG. 5 is a planar view of an alternative embodiment illustrating a second retro-reflector for increasing the brightness of the image to the eye.

Referring to FIG. 5 a second alternate embodiment is illustrated. A second retro-reflective screen 62a is positioned underneath the beam splitter 60. In operation, the light from the miniature display 54 passes through the beam splitter 60 and onto the retro-reflective screen 62a, where the light is then reflected back to the beam splitter 60 and to the eye 64, while the light that is reflected from the first retro-reflective screen 62 passes through the beam splitter to the eye thereby forming a combined image having greater illumination that that formed by only retro-reflective screen 62.

A third conceived embodiment (not shown), contemplates that the micro display is positioned on the helmet several inches or more behind the mirror. In this configuration, the center of gravity is displaced rearward toward the neck of the individual wearing the helmet. As is well known, locating the center of gravity towards the axis of the wearer's neck is more comfortable and less fatiguing to the wearer.

In a fourth conceived embodiment, the retro-reflective screen is replaced by a partially retro-reflective screen thereby permitting ambient light to pass through the partially retro-reflective screen to the eye. The image observed by the eye in this exemplary embodiment consists of the ambient environmental images combined with the images from the image generator thereby providing an augmented reality environment.

As illustrated hereinabove the exemplary HMPD has numerous advantages compared to alternative HMD designs. The image has less distortion than an eyepiece design because the embodiment is a projection system. In addition, optical symmetry about the aperture stop minimizes the distortion. The aberrations can easily be controlled since all of the optical elements are on axis. By adding the appropriate glass index chromatic aberration can be minimized. In addition, the inherent distortion that plagues the FFS prism is well below the human visual detection in the novel embodiments described herein.

The exemplary embodiment produced an overall distortion of 1.05% at the maximum point in the field whereas, the human detectability percentage is 2.5% or greater. Another benefit is that the illustrated embodiment has a greater potential of scalability such that the eye relief can be easily increased by simply increasing the distance between the first Fno. ~1 lens and projection lens system. In addition, exit pupil can be increased and the FOV optimized while keeping all of the aberrations to a minimum. The overall size between the prior art FFS prism and the exemplary embodiments are comparable: the prior art FFS prism was packaged into an approximate envelope of 2.2"×1.9"×1.6" although the exemplary embodiment is slightly longer in the vertical and encompasses an overall dimension of 3.3"×1.6"×1.6".

Figure 2:
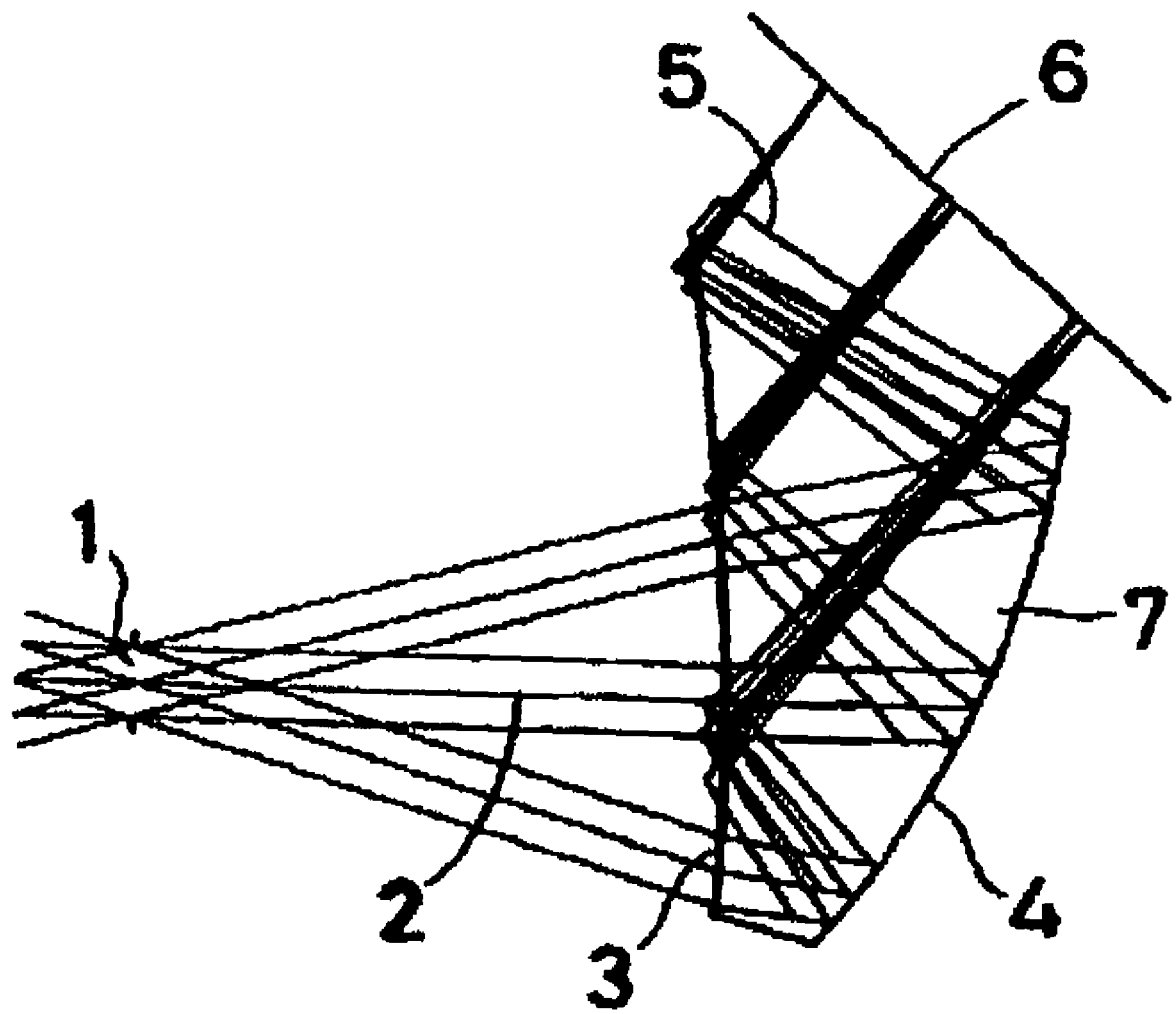
FIG. 2 is a planar view of an exemplary off-axis prism.

As can be appreciated the illustrated embodiments have advantages over the prior art prism shown in FIG. 2. In particular, the aberrations can easily be controlled since all of the optical elements are on axis. Furthermore, chromatic aberration can be minimized by adding the appropriate glass index.

While preferred embodiments have been shown and described, various modifications and substitutions may be made thereto without departing from the spirit and scope of the present invention. Accordingly, it is to be understood that the present invention has been described by way of illustrations and not limitation.

What is claimed is:

1. A head mounted projection display (HMPD) optical lens assembly for transmitting and magnifying a real image to an eye comprising:
   (a) a miniature display,
   (b) a projection lens system for receiving the light rays from the display,
   (c) a second lens having a Fno between 0.1 and 3.0 positioned to receive the light rays from the projection lens for adjusting eye relief,
   (d) a beam splitter positioned for receiving and splitting the light rays from the second lens,
   (e) a retro-reflective screen positioned for receiving the a reflected portion of the split light rays from the beam splitter and then reflecting the portion of split light rays along a partially conjugate optical path relative to the incident light wherein the portion of split light rays passes through the beam splitter,
   (f) a third lens having a Fno between 0.1 and 3.0 positioned to receive the portion of split light rays from the retro-reflective screen that passes along a partially conjugate path and through the beam splitter, the third lens passing the light for viewing of the real image at the optical exit pupil by the, and
   (g) wherein the FOV is between 15 degrees and 50 degrees, said FOV having an overall distortion being less than 2.05% at the maximum point in the field, and the eye relief is between 15 mm to 50 mm.

2. The head mounted projection display optical lens assembly of claim 1 wherein the miniature display comprises a liquid crystal display.

3. The head mounted projection optical lens assembly of claim 1 wherein the projection lens assembly comprises a landscape lens.

4. The head mounted projection display optical lens assembly of claim 1 wherein the miniature display includes an external light source.

5. The head mounted projection display optical lens assembly of claim 1 wherein the second lens is a Fresnel lens.

6. The head mounted projection display optical lens assembly of claim 1 wherein the third lens is a Fresnel lens.

7. The head mounted projection display optical lens assembly of claim 1 further comprising a mirror disposed between the miniature display and the projection lens system for relaying the light from the miniature display to the landscape lens.

8. The head mounted projection display optical assembly of claim 1 further comprising a mirror disposed between the miniature display and the projection lens system for relaying the light from the miniature display to the landscape lens, wherein the miniature display is positioned at least one inch from the mirror for shifting the center of gravity of the head mounted projection display assembly.

9. The head mounted projection display optical lens assembly of claim 1 further comprising a second retro-reflective screen positioned for receiving light rays from the second lens and through the beam splitter, wherefore the light rays being reflected from the second retro-reflective screen along an at least partially conjugate path and the light rays being further reflected from the beamsplitter for enhancing the image brightness perceived at the exit pupil.

10. The head mounted projection display optical lens assembly of claim 1 further comprising, a second retro-reflective screen positioned for receiving light rays from the second lens passing through the beam splitter, the light rays then being reflected from the second retro-reflective screen along an at least partially conjugate path and then being reflected from the beam splitter for enhancing the image brightness perceived at the exit pupil and wherein the second lens is a Fresnel lens and the third lens is a Fresnel lenses.

11. The head mounted projection display optical lens assembly of claim 1 further comprising, a second retro-reflective screen positioned for receiving light rays from the second lens, the rays passing through the beam splitter, the light rays then being reflected from the second retro-reflective screen along an at least partially conjugate path and then being reflected from the beam splitter for enhancing the image brightness perceived at the exit pupil, a mirror disposed between the miniature display and the landscape lens for relaying the light from the miniature display to the landscape lens, and wherein the second lens is a Fresnel lens, and the third lens is a Fresnel lenses.

12. The head mounted projection display optical lens assembly of claim 1 wherein the projection lens is selected from the group consisting of landscape, double Gauss and fisheye.

13. The head mounted projection display optical lens assembly of claim 1 wherein the projection lens is a Fresnel lens.

14. The head mounted projection display optical lens assembly of claim 1 having, a second retro-reflective screen mounted below the beam splitter so that the split rays from each beamsplitter will recombine to create image with enhanced brightness.

15. A binocular comprising the head mounted projection display optical lens assembly of claim 1.

16. A head mounted projection display (HMPD) optical lens assembly for transmitting and magnifying a real image to an eye comprising:
   (a) a miniature display,
   (b) a projection lens system for receiving the light rays from the display,
   (c) a second lens having a Fno between 0.1 and 3.0 positioned to receive the light rays from the projection lens for adjusting eye relief,
   (d) a beam splitter positioned for receiving and splitting the light rays from the second lens,
   (e) a retro-reflective screen positioned for receiving the a reflected portion of the split light rays from the beam splitter and then reflecting the portion of split light rays along a partially conjugate optical path relative to the incident light wherein the portion of split light rays passes through the beam splitter,
   (f) a third lens having a Fno between 0.1 and 3.0 positioned to receive the portion of split light rays from the retro-reflective screen that passes along a partially conjugate path and through the beam splitter, the third lens passing the light for viewing of the real image at the optical exit pupil by the eye, and
   (g) wherein the retro-reflective screen comprises, a partially retro-reflective screen for permitting ambient light to pass through the partially retro-reflective screen to the eye.

17. A land combat warrior system comprising a head mounted projection display optical lens assembly comprising:
   (a) a miniature display,
   (b) a projection lens for receiving the light rays from the display,
   (c) a second lens having a Fno between 0.1 and 3.0 positioned to receive the light rays from the projection lens,
   (d) a beam splitter positioned for receiving and splitting the light rays from the second lens,
   (e) a retro-reflective screen positioned for receiving the a reflected portion of the split light rays from the beam splitter and then reflecting the portion of split light rays along a partially conjugate optical path relative to the incident light wherein the portion of split light rays passes through the beam splitter,
   (f) a third lens having a Fno between 0.1 and 3.0 positioned to receive the portion of split light rays from the retro-reflective screen that passes along a partially conjugate path and through the beam splitter, the third lens passing the light for viewing of the real image at the optical exit pupil by the eye, and
   (g) wherein the retro-reflective screen comprises, a partially retro-reflective screen for permitting ambient light to pass through the partially retro-reflective screen to the eye.

* * * * *